(12) United States Patent
Nowak (10) Patent No.: US 10,581,727 B2
(45) Date of Patent: Mar. 3, 2020

(54) SYSTEM AND METHOD FOR USING BIOMETRICS TO ROUTE DATA IN SOFTWARE DEFINED NETWORKS

(71) Applicant: Mastercard International Incorporated, Purchase, NY (US)

(72) Inventor: Dawid Nowak, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 15/974,366

(22) Filed: May 8, 2018

(65) Prior Publication Data

US 2018/0351856 A1 Dec. 6, 2018

(30) Foreign Application Priority Data

May 30, 2017 (EP) ..................................... 17173478

(51) Int. Cl.
| | |
|---|---|
| *H04L 12/725* | (2013.01) |
| *H04L 29/06* | (2006.01) |
| *G06F 21/32* | (2013.01) |
| *G06K 9/00* | (2006.01) |
| *H04L 12/24* | (2006.01) |

(52) U.S. Cl.
CPC ............ *H04L 45/308* (2013.01); *G06F 21/32* (2013.01); *G06K 9/00926* (2013.01); *H04L 41/0803* (2013.01); *H04L 63/0861* (2013.01); *H04L 63/102* (2013.01); *H04L 63/105* (2013.01); *H04L 2212/00* (2013.01)

(58) Field of Classification Search
CPC .................................................... H04L 45/308
See application file for complete search history.

(56) References Cited

U.S. PATENT DOCUMENTS

| | | | |
|---|---|---|---|
| 2005/0232277 A1* | 10/2005 | See .......................... | H04L 49/90 370/395.52 |
| 2006/0268828 A1 | 11/2006 | Yarlagadda | |

(Continued)

OTHER PUBLICATIONS

"Communication: Extended European Search Report", dated Dec. 11, 2017 (dated Nov. 12, 2017), European Patent Office, for European Application No. 17173478.3-1853, 9pgs.

*Primary Examiner* — Samina F Choudhry
(74) *Attorney, Agent, or Firm* — Buckley, Maschoff & Talwalkar LLC (57) ABSTRACT

Method for individualized data routing in a network, the method comprising the steps of initiating, on a user terminal, an enrolment process for registering a user of the user terminal for individualized data routing services, generating during the enrolment process, at a routing client application, a personal routing template, the template including at least individual routing parameters and user authentication information, prompting, on the user terminal by the routing client application, authentication of the user, selecting, on the user terminal by the routing client application, a personal routing template based on the user authentication information stored in the template, encapsulating, by the routing client application on the user terminal, a data package to be routed based on the information stored in the personal routing template by associating the individual routing parameters to the data package; and transmitting, by the routing client application, the encapsulated data package to a core network.

12 Claims, 4 Drawing Sheets

(56) References Cited

U.S. PATENT DOCUMENTS

2007/0061590 A1* 3/2007 Boye .................... G06F 21/305
                                                          713/186
2014/0289833 A1* 9/2014 Briceno ................ H04L 63/08
                                                          726/7
2016/0117682 A1    4/2016 Srinath et al.

* cited by examiner

SYSTEM AND METHOD FOR USING BIOMETRICS TO ROUTE DATA IN SOFTWARE DEFINED NETWORKS

CROSS-REFERENCE TO RELATED APPLICATION

This application is a U.S. National Stage filing under 35 U.S.C. § 119, based on and claiming benefits of and priority to, European Patent Application No. 17173478.3 filed on May 30, 2017. The entire disclosure of the above application is incorporated herein by reference.

TECHNICAL FIELD

The present disclosure relates to the field of data routing. More particularly, the present disclosure relates to a method for individualised data routing. Moreover, the disclosure relates to a user terminal, a computer program product and a computer readable medium. The computer readable medium comprises computer-executable instructions, which, when executed by the respective device(s) being equipped with processors causing the device(s) to perform the method steps of the disclosure on the user terminal.

BACKGROUND

Routing of data is a process of selecting a path for transmitting data in a network, such as a computer network or a telecommunications network, or between or across multiple networks. Data to be routed is normally in form of a discrete, discontinuous representation of the information, i.e. in form of digital data. Accordingly, on this basic level, there is no different between different data besides the encoded content/information. Some information, e.g. regarding the destination of the data package is included into a header during encapsulation.

In traditional networks, e.g. IP-based networks, data is typically routed from one node to the next node until the destination as indicated in the header is reached. Every node is configured to comprise as an autonomous system a proper set of routing parameters. The next step for data to be routed is determined on every node handling the data based on the routing parameters locally stored in a routing table. Accordingly, it is only possible for the user to specify the destination but not the path to be used when transmitting the data package.

However, data from different sources may require different, specific data handling, which also includes the routing. This might be because of technical but also because of personal requirements.

As an example, if a user wants to establish a video conference call. If this traffic is routed through normal channels it will be multiplexed with other sources of information and could suffer from congestion, jitter and lag. As a result, the quality of the video conference call, and as such the user experience will suffer. In order to avoid this, appropriate routing, taking into account the data source might be applied.

As another example, a user might subscribe for a distinct service level with a service provider. On the other hand if service provider could detect that the traffic sent is of high importance and customer has subscribed to a premium service the service provider could then alter the routing tables based on some rules and send the call via a completely different route with more stringent quality levels ensuring that the customer is getting a better experience.

As another example, transfer of data may require additional security, e.g the data should not be sent through certain locations (network nodes countries/etc.) where it could be snooped on.

As the nodes in traditional networks act autonomously based on the routing tables, every data package is normally handled the same way, even though it is tried to control network traffic by including certain parameters.

In contrast thereto, in modern networks, so called software defined networks, routing parameters are held centrally, on a control plane, whereas forwarding of the data according to the routing parameters is done by the underlying system, the so called data plane. Due to the centralised approach, individual routing is technical possible, but still requires respective configuration on the level of the control plane. For the user of the network, who wants to or has to transmit data, there is no possibility to decide on routing path and data handling.

Accordingly, there is a need to enhance the possibilities for making use of individualized routing for the users.

SUMMARY OF THE INVENTION

The present disclosure provides one or more solutions to the problems and disadvantages of the background art. Other technical advantages of the present disclosure will be readily apparent to one skilled in the art from the following description and claims.

The present disclosure is directed to a computer implemented method individualized data routing in a network, the method comprising:
Initiating, on a user terminal, an enrolment process for registering a user of the user terminal for individualized data routing services;
Generating during the enrolment process, at a routing client application on a user terminal, a personal routing template, the template including at least individual routing parameters and user authentication information;
Prompting, on the user terminal by the routing client application, authentication of the user;
Selecting, on the user terminal by the routing client application, a personal routing template based on the user authentication information stored in the template;
Encapsulating, by the routing client application on the user terminal, a data package to be routed based on the information stored in the personal routing template by associating the individual routing parameters to the data package; and
Transmitting, by the routing client application, the encapsulated data package to a core network.

The present disclosure is further directed to a computer implemented method for individualized data routing in a network, the method comprising:
Initiating, on a user terminal, an enrolment process for registering a user of the user terminal for individualized data routing services;
Generating during the enrolment process, at a routing client application on a user terminal, a personal routing template, the template including at least individual routing parameters and user authentication information;
Prompting, on the user terminal by the routing client application, authentication of the user;
Encapsulating, by the routing client application on the user terminal, a data package to be routed based on the information stored in the personal routing template including the user authentication information;

Transmitting, by the routing client application, the encapsulated data package to a core network; and Selecting, by the core network, a personal routing template based on the user authentication information stored in the template.

The present disclosure includes multiple aspects for individualized data routing in a network. Data to be routed may be any kind of digital data from all kind of different sources. Non-limiting examples for data/or and data sources are text files, emails, messaging services, audio files, image files and the like. Individualized routing may be based on software defined networks (SDN) or any other kind of network structure, which allow individualized data routing as known to the person skilled in the art.

Before using the individualized routing functionality, a designated user of this functionality registers for the service by initiating and proceeding with an enrolment process. Accordingly, when the user uses the individualized data routing service for the first time. The enrolment process may be based on or may be accessible through a dedicated application executed on the terminal, such as an routing client application, or a plugin, an inFrame solution, a SDK or the like implemented on a web site. The enrolment process may be initiated on a user terminal. The terminal may be any device providing an interface to interact with the user in order to receive instructions and/or information from the user, such as smartphones, personal computers, tablet computers comprising detection means for the respective characteristic(s), such as cameras or scanning devices, microphones, and configured to execute a respective application, but also dedicated biometric scanning devices and combined devices consisting of detection and processing units. The terminal may also comprise communication means and may also be connected to a network, such as the internet.

During the enrolment process, a personal routing template is generated. The personal routing template may include individual routing parameters and user authentication information. The individual routing information may comprise over-all routing instructions for all data to be routed or may comprises dedicated routing information for specific data types or sources. The individual routing parameters may also comprise negative routing instructions, e.g. nodes or locations to be avoided when defining the routing path.

During the enrolment process the routing client application also prompts authentication of the user. User authentication information may be the combination of user name and a password or PIN. The user authentication may also be based on biometric verification and/or authentication making use of biometric data. If biometric data is used, a biometric sample from the user is captured by the respective detection means, processed and stored. Any kind of biometric information as known to the person skilled in the art may be used. The biometric sample may be based on aspects of human physiology, chemistry or behaviour that show characteristics and as such can be used for biometric authentication. Non-limiting examples for characteristics to be used for biometric authentication may be any one, or combination, of the following: fingerprint, palm veins, face recognition, DNA, palm print, hand geometry, iris recognition, retina and odour/scent but also behavioural characteristics such as typing rhythm, gait, and voice. Raw data of the biometric data may be any form of unprocessed and/or uncompressed data of the captured information of the respective characteristic(s) to be used for biometric authentication.

After the biometric information has been captured, the resulting raw data of the biometric sample is further processed as known to the person skilled in the art. The processing may be performed on the terminal or on the server and may be integrated and as such forming part of other applications of the routing application. During processing, characteristic features of the raw data of the biometric sample extracted and a biometric template created. The features to be extracted depend on the biometric sample used and are known to the person skilled in the art. The biometric template contains at least some characterising features of the biometric sample which will than be used for biometric authentication. The amount of features may depend on the required security level and/or on the available processing capabilities. The template creation may be implemented in the routing application or may be processed by an additional template creation application Storage may be on the terminal and/or on a server, however, storage of the captured data (raw data of the biometric sample) is preferably on a secure storage medium. If the raw data of the biometric sample is transmitted from the terminal to a server a secure communication channel may be used.

User authentication may also be prompted after the initial enrolment process when the routing client application is started or when a personal routing template is to be used for routing data. The personal routing template may require user authentication before opening, amending or using.

The user authentication information may also be transmitted to a routing configuration server. The user authentication information may be sent to the routing configuration server together with the personal routing profile. The user authentication information and/or the personal routing information may be stored in a user profile associated to the user of the routing client application in form of user profile data in a respective database. The database may be accessible by and/or via the routing configuration server.

User authentication information may be used to identify and to select a personal routing template. The user authentication information may be substituted by any unique identifier associated to the user and stored in the user profile. The unique identifier may also be used for identifying the personal routing template associated to the respective user. The personal routing template may be stored on the terminal or on the server, such as the routing configuration server. If the personal routing template is stored on the template, the respective information for routing may be acquired from the template after authorisation. If the personal routing template is stored on a server, the routing client application may connect to the server, select the corresponding personal routing template based on the user authentication and may download the personal routing template or part of the personal routing template. Alternatively, the personal routing template may be selected by the routing configuration server responsive to receiving data to be routed.

After authentication of the user, data to be routed according the personal routing template is encapsulated resulting in an encapsulated data package. The encapsulated data package comprises at least the data to be routed and in addition user authentication information and/or routing information based on the personal routing template. The encapsulated data package is transmitted to the core network for further processing. When the encapsulated data package comprises the routing information based on the personal routing template, the encapsulated data package is routed according to the routing information.

When the encapsulated data comprises no routing information but user authentication information, i.e. user authentication information is associated to the encapsulate data package, the routing configuration server may connect to the respective database in order to identify and select to appropriate personal routing template based on the user authentication information. Connection to the routing configuration server and/or the database storing the user profile my also be initiated by any suitable instance of the core network. The user authentication information may also be substituted by any unique identifier suitable for identifying the personal routing template.

After the personal routing template is selected, at the core network the data package to be routed based on the information stored in the personal routing template may be encapsulated by associating the individual routing parameters to the data package. The respective routing information may be added to the header of the encapsulated data package.

In another aspect of the present disclosure, the routing configuration server further includes an authentication engine. In these cases, the routing client application executed on the user terminal may prompt authentication of the user, abut the authentication as such is performed on the routing configuration server. The user profile stored in the respective database may comprise the required authentication information, e.g. user name and the corresponding password or a biometric sample as described above, or any other information suitable for authentication of the user. The respective required authentication data acquired by the routing client application is transmitted to the routing configuration server for storage in the respective database. Transmitting the authentication data may make use of a secure communication channel and/or the authentication data may be separated into different data files which are sent independent from each other.

In another aspect of the present disclosure, the user profile may further comprise financial information. The user profile may comprise bank account information or payment card, such as debit or credit cards, information associated to the user registered to the routing service. The respective financial information may be added by the user during the enrolment process. If a selected individual routing service requires additional payment, the respective charges can be initiated by respective financial transactions request as known to the person skilled in the art. In addition, processing of the data routing may be delayed until the payment for the service is processed.

The present disclosure is also directed to a terminal arranged each of the method steps of the disclosure The present disclosure is also directed to a computer program computer program product comprising program instructions for carrying out each of the method steps of the disclosure, when said product is executed on a computer.

Further, the present disclosure is directed to a computer readable medium storing program instructions, which, when executed by a processor of a computer cause the computer to perform each of the method steps of the disclosure.

One advantage that may be realized in the practice of some embodiments of the described methods is that data can be routed in accordance with personal requirements of a user, and that the respective routing scheme implementing these requirements can be selected automatically based on a user authorisation process. Other technical advantages of the present disclosure will be readily apparent to one skilled in the art from the following description of preferred embodiments and the claims. Various embodiments of the present application obtain only a subset of the advantages set forth. No single advantage is critical to the embodiments. Any claimed embodiment may be technically combined with any other claimed embodiments.

The accompanying drawings illustrate exemplary embodiments of the disclosure and serve to explain, by way of example, the principles of the disclosure.

DETAILED DESCRIPTION

The present disclosure will now be described more fully hereinafter with reference to the accompanying figures, in which preferred embodiments are shown. The method, however, may be embodied in many different forms and should not be construed as limited to the embodiments set forth herein. It should be noted that these figures are intended to illustrate the general characteristics of the methods utilized in certain embodiments. However, the figures may not precisely reflect the precise structure or performance characteristic of any given embodiment. Moreover, in the figures like reference numerals designate corresponding parts throughout the different views or embodiments.

Figure 1:
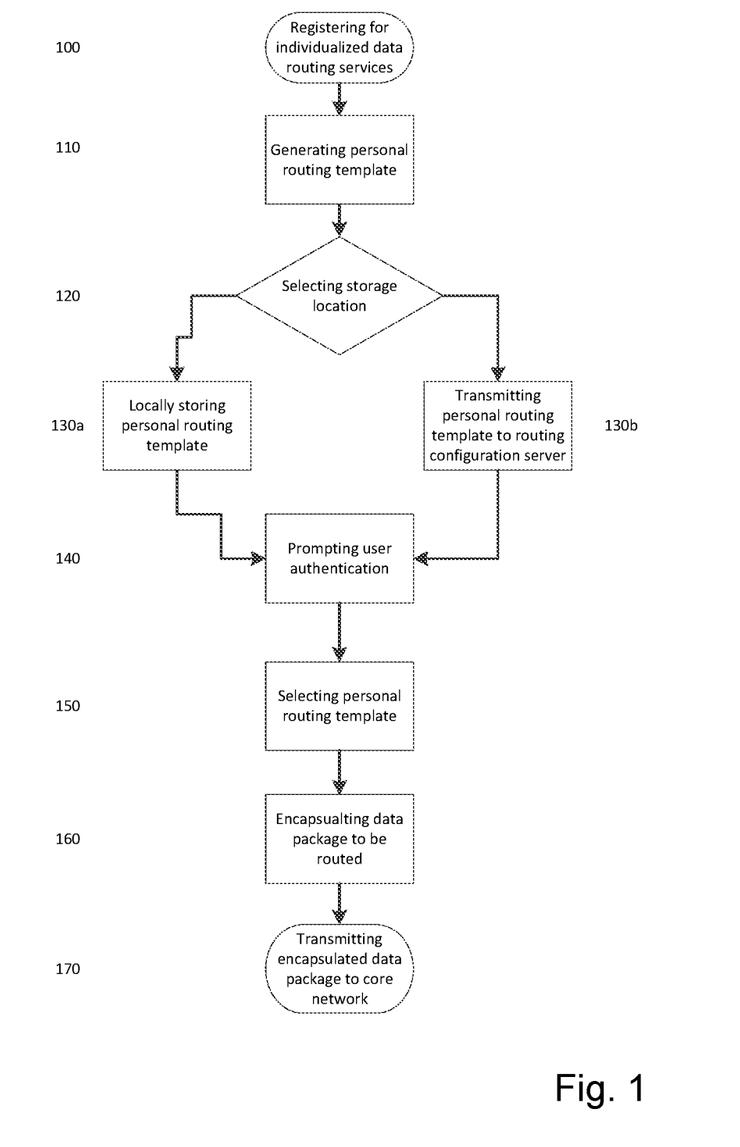
FIG. 1 shows a flowchart of the biometric based signing process.

FIG. 1 is a flowchart illustrating exemplary steps for individualized data routing according to one embodiment of the invention. In step 100 the process is initiated by registering a user for individualized data routing services. For this an enrolment process is initiated by the user on a user terminal, such as a smart phone or a computer. For the enrolment process a respective application, i.e. a routing client application is executed on the user terminal. During the enrolment process, a personal routing template is generated at step 110. The personal routing template includes specific rules regarding routing requirements or preferences by the user or indication of routing services subscribed by the user. The enrolment process may be accompanied by a user authentication step (not shown in the figure), wherein the acquired user authentication information is at least partially associated to the personal routing template. The enrolment process may also be accompanied by a service registration step, for subscribing to certain routing services by a service provider.

At step 120 a storage location for the generated personal routing template is selected. This selection may be automatically and not visible for the user and in dependence to the general setup of the routing client application, in this case stored in a respective preference file. Accordingly, at step 130a, depending on the section of the routing client application preferences, the personal routing template is stored locally on the user terminal, preferably in a secure section of am memory of the user terminal and accusable by the routing client application after authentication of the user. In addition or alternatively, the personal routing template is transmitted at step 130b to a routing configuration server and is then stored on the routing configuration server. However, in dependence of the user selection or the preferences, the template can also be stored both locally and on the routing configuration server.

At step 140, when the user wants to make use of the individualized routing services, the routing client application prompts the user for user authentication. This step may take place when the routing client application is started or when individualized routing services are to be used. User authentication can be based on biometric information, such as fingerprint scanning or any other biometric authentication method known to the person skilled in the art and described above. The user authentication information acquired during user authentication is used at step 150 select and/or access the personal routing template. If the personal routing template is stored locally on the user terminal, the authentication allows access to the personal routing template. If multiple different template are stored, the authentication information may also be used for identifying the correct template. If the personal routing template is stored in the routing configuration server, the authentication information is used to identify the template associated to the user.

In step 160, the data to be transmitted is encapsulated making use of the information provided in the personal routing template. In this step, also the kind of data may be considered, in order to specify the correct routing information for the respective data type. In the encapsulation process, the relevant routing information is added to the header of the file in order to allow correct routing of the data.

After encapsulation, in step 170, the data is transmitted to the core network for processing, i.e. for routing the data to the target destination according to the specification given in the personal routing template.

Figure 2:
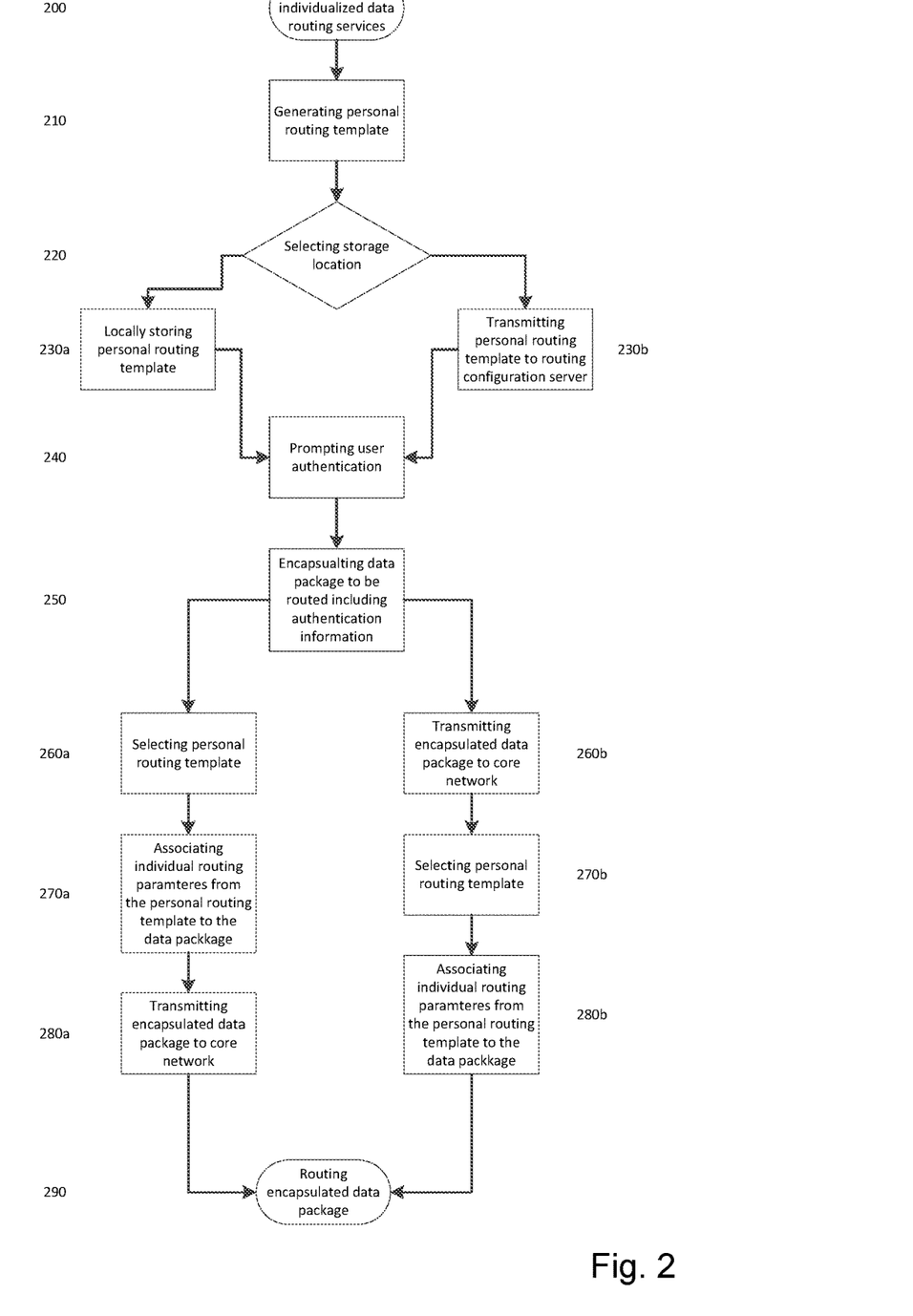
FIG. 2 is block diagram showing the entities involved in combination with the steps of the enrolment process for the biometric authentication method.

FIG. 2 is a flowchart illustrating exemplary steps for individualized data routing according to another embodiment of the invention. Similar to the flowchart shown in FIG. 1, in step 200 the process is initiated by registering a user for individualized data routing services. For this an enrolment process is initiated by the user on a user terminal, such as a smart phone or a computer. For the enrolment process a respective application, i.e. a routing client application is executed on the user terminal. During the enrolment process, a personal routing template is generated at step 210. The personal routing template includes specific rules regarding routing requirements or preferences by the user or indication of routing services subscribed by the user. The enrolment process may be accompanied by a user authentication step (not shown in the figure), wherein the acquired user authentication information is at least partially associated to the personal routing template. The enrolment process may also be accompanied by a service registration step, for subscribing to certain routing services by a service provider.

At step 220 a storage location for the generated personal routing template is selected. This selection may be automatically and not visible for the user and in dependence to the general setup of the routing client application, in this case stored in a respective preference file. Accordingly, at step 230a, depending on the section of the routing client application preferences, the personal routing template is stored locally on the user terminal, preferably in a secure section of am memory of the user terminal and accusable by the routing client application after authentication of the user. In addition or alternatively, the personal routing template is transmitted at step 230b to a routing configuration server and is then stored on the routing configuration server. However, in dependence of the user selection or the preferences, the template can also be stored both locally and on the routing configuration server.

At step 240, when the user wants to make use of the individualized routing services, the routing client application prompts the user for user authentication. This step may take place when the routing client application is started or when individualized routing services are to be used. User authentication can be based on biometric information, such as fingerprint scanning or any other biometric authentication method known to the person skilled in the art and described above. The user authentication information acquired during user authentication is associated at step 250 to the data to be transmitted according to the specification given in the personal routing template. The association of the authentication information may be done in an encapsulation step and may include the entire authentication information or at least the information needed to select the adequate personal routing template.

Based on the on the authentication information associated to the data to be routed, a personal routing template is selected and/or accessed. If the personal routing template is stored locally on the user terminal, the personal routing template is selected and/or accessed at step 260a. After the personal routing template is selected, the relevant routing information is associated at step 270a to the data package. This process can include consideration of the data type in order to be associated the information relevant for the specific data type only. In this association process, the relevant routing information is added to the header of the file in order to allow correct routing of the data.

After the relevant routing information is associated to the data package, the data package is in step 280a, the data is transmitted to the core network for processing at step 290, i.e. for routing the data to the target destination according to the specification given in the personal routing template.

If the personal routing template is stored on the routing configuration server, the data package encapsulated in step 250 is transmitted in step 260b to the core network. The core network then connects to the routing configuration server and a personal routing template is selected at step 270b. If different routing configuration server may be connected, information regarding the routing configuration server to be connected may also be included in the encapsulated data package received from the user terminal.

After the personal routing template is selected, the relevant routing information is associated at step 280b to the data package. This process can include consideration of the data type in order to be associated the information relevant for the specific data type only. In this association process, the relevant routing information is added to the header of the file in order to allow correct routing of the data.

After the relevant routing information is associated to the data package is processed by the core network at step 290, i.e. the data is routed to the target destination according to the specification given in the personal routing template.

Figure 3:
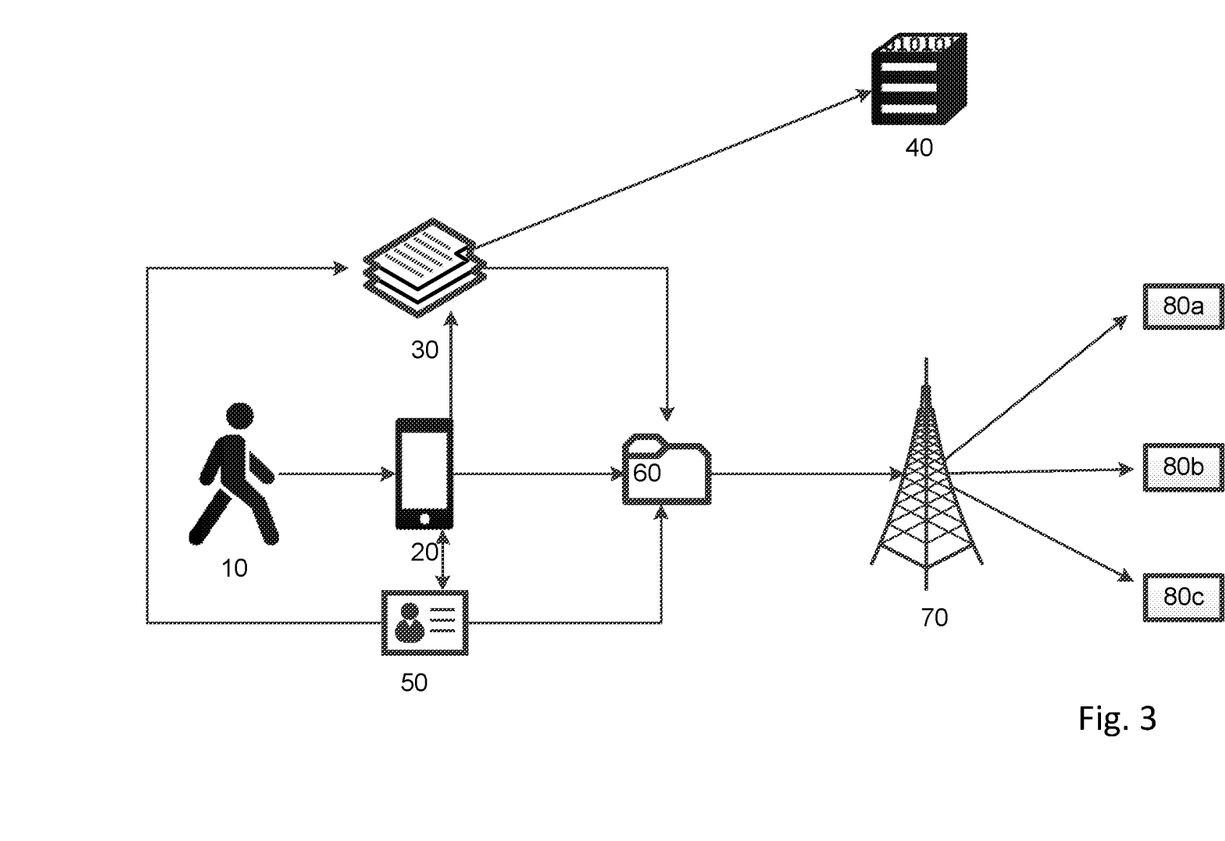
FIG. 3 is a block diagram showing the entities involved in combination with the steps of the biometric based signing process.

FIG. 3 is a block diagram showing the entities involved in method for individualized data routing as described in the context of FIG. 1. A user 10 initiates the registration process for individualized data routing services on a user terminal, in this case on a smart phone 20. During an enrolment process, a personal routing template 30 is generated and during an associated user authentication process user authentication information 50 is created. The user authentication information 50 is at least partially associated to the personal routing template 30. The personal routing template 30 is stored locally on the smart phone 20 or on a routing configuration server 40.

If the user 10 wants to make use of the individualized routing services, authentication of the user is prompted and based on the authentication result the locally stored personal routing template 30 is selected and/or accessed. Alternatively or in addition, the smart phone 20 may connect to the routing configuration server 40 and the corresponding personal routing template 30 may be based on the authentication information 50 acquired during the user authentication process. The respective personal routing template is transmitted at least partially to the smart phone 20. Data 60 to be routed is encapsulated on the smart phone 20. In this process, at the routing information relevant for the selected data type and, optionally, user information is added to the header of the data package. The resulting encapsulated data 60 is transmitted to the core network 70 for further processing according to the routing information added to the data 60. Based on the specified routing information, the data is routed via routers 80a, 80b, or 80c and subsequent path specified in the associated routing information to the target destination.

Figure 4:
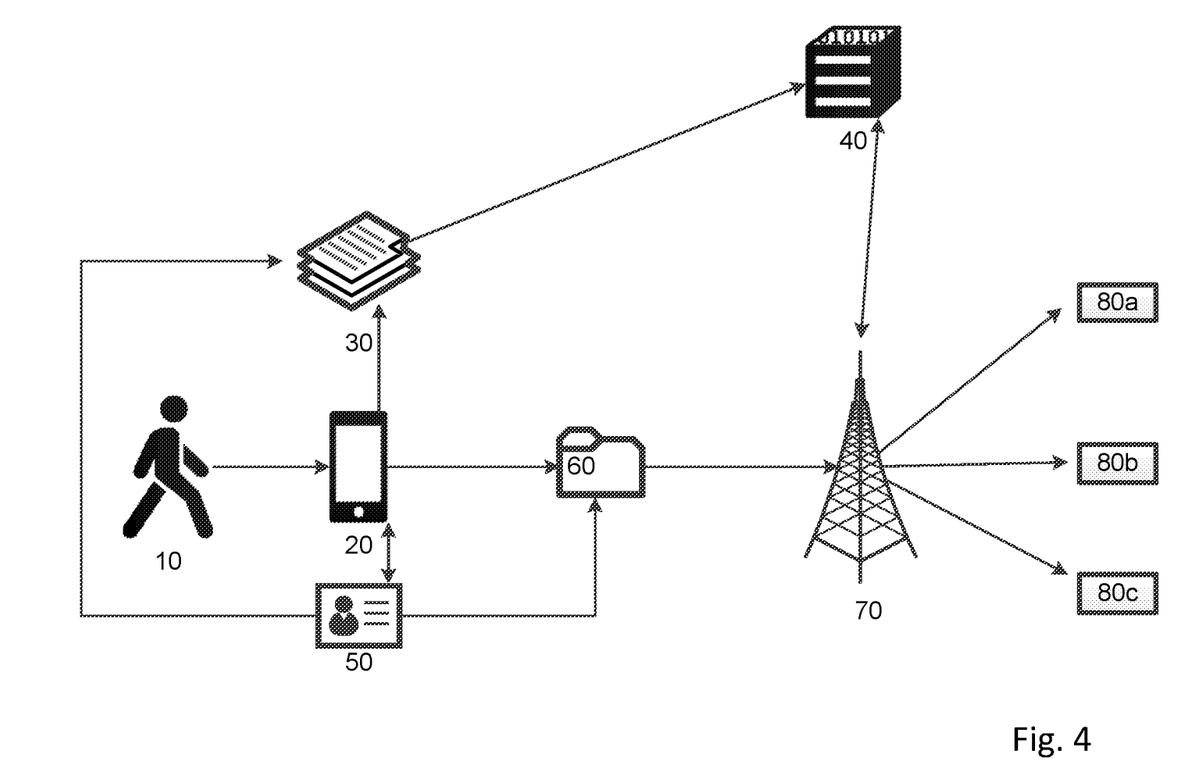
FIG. 4 is a block diagram showing the entities involved in combination with the steps of the biometric based signing process in a multi-user environment.

FIG. 4 is a block diagram showing the entities involved in method for individualized data routing as described in the context of FIG. 2. A user 10 initiates the registration process for individualized data routing services on a user terminal, in this case on a smart phone 20. During an enrolment process, a personal routing template 30 is generated and during an associated user authentication process a user authentication information 50 is created. The user authentication information 50 is at least partially associated to the personal routing template 30. The personal routing template 30 is stored locally on the smart phone 20 or on a routing configuration server 40.

If the user 10 wants to make use of the individualized routing services, authentication of the user is prompted and the authentication information 50 is at least partially added the data file 60 to be routed.

Based on the authentication result the locally stored personal routing template 30 is selected and/or accessed. Data 60 to be routed is encapsulated on the smart phone 20. In this process, at the routing information relevant for the selected data type and, optionally, user information is added to the header of the data package. The resulting encapsulated data 60 is transmitted to the core network 70 for further processing according to the routing information added to the data 60. Based on the specified routing information, the data is routed via routers 80a, 80b, or 80c and subsequent path specified in the associated routing information to the target destination.

Alternatively the data 60 with the associated authentication information 50 is transmitted to the core network 70. In this case, the encapsulated data may also comprise information regarding a routing configuration server 40 storing the corresponding personal routing template. The core network 70, after having received data 60, connects to the routing configuration server 40 and the corresponding personal routing template 30 is selected based on the authentication information 50 acquired during the user authentication process and associated to data 60.

The respective personal routing template 30 is transmitted at least partially to the core network 70. Data 60 to be routed is encapsulated on the core network 70. In this process, at the routing information relevant for the selected data type and, optionally, user information is added to the header of the data package. Based on the specified routing information, the data is then routed via routers 80a, 80b, or 80c and subsequent path specified in the associated routing information to the target destination.

This description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

The invention claimed is:

1. A method for individualized data routing in a network, the method comprising
    initiating, on a user terminal, an enrolment process requiring user financial data for registering a user of the user terminal for individualized data routing services;
    generating during the enrolment process, at a routing client application on a user terminal, a personal routing template, the personal routing template including at least individual routing parameters comprising routing interactions for all data to be routed and user authentication information;
    prompting, on the user terminal by the routing client application, authentication of the user;
    selecting, on the user terminal by the routing client application, a personal routing template based on the user authentication information stored in the personal routing template;
    encapsulating, by the routing client application on the user terminal, a data package to be routed based on the information stored in the personal routing template including the user financial data by associating the individual routing parameters to the data package; and
    transmitting, by the routing client application, the encapsulated data package to a core network.

2. The method for individualized data routing in a network according to claim 1, wherein the personal routing template is transmitted to a routing configuration server.

3. The method for individualized data routing in a network according to claim 2, wherein the selection step further comprises:
    connecting the routing client application to the routing configuration server for selecting the personal routing template stored on the routing configuration server.

4. A method for individualized data routing in a network, the method comprising:
    initiating, on a user terminal, an enrolment process requiring user financial data for registering a user of the user terminal for individualized data routing services;
    generating during the enrolment process, at a routing client application on a user terminal, a personal routing template, the personal routing template including at least individual routing parameters comprising routing interactions for all data to be routed and user authentication information;
    prompting, on the user terminal by the routing client application, authentication of the user;
    encapsulating, by the routing client application on the user terminal, a data package to be routed based on the information stored in the personal routing template including the user financial data and the user authentication information;
    transmitting, by the routing client application, the encapsulated data package to a core network; and
    selecting, by the core network, a personal routing template based on the user authentication information stored in the personal routing template.

5. The method according to claim 4, wherein the user authentication information is associated to the encapsulate data package.

6. The method for individualized data routing in a network according to claim 4, wherein the personal routing template is transmitted to a routing configuration server.

7. The method for individualized data routing in a network according to claim 6, wherein the selection step further comprises:
connecting the core network to the routing configuration server for selecting the personal routing template stored on the routing configuration server.

8. The method according to claim 7, further comprising the step of encapsulating, by the core network, the data package to be routed based on the information stored in the personal routing template by associating the individual routing parameters to the data package.

9. The method according to claim 6, wherein the routing configuration server further includes an authentication engine.

10. The method for individualized data routing in a network according to claim 9, wherein the authentication data prompted by the routing client application is transmitted to the routing configuration server for authentication.

11. The method for individualized data routing in a network of claim 4, wherein the authentication of the user is based on biometric factors.

12. A non-transitory computer-readable medium having instructions stored thereon and executable by one or more processors to perform a method for individualized data routing in a network, the method comprising:
initiating, on a user terminal, an enrolment process requiring user financial data for registering a user of the user terminal for individualized data routing services;
generating during the enrolment process, at a routing client application on a user terminal, a personal routing template, the personal routing template including at least individual routing parameters comprising routing interactions for all data to be routed and user authentication information;
prompting, on the user terminal by the routing client application, authentication of the user;
selecting, on the user terminal by the routing client application, a personal routing template based on the user authentication information stored in the template;
encapsulating, by the routing client application on the user terminal, a data package to be routed based on the information stored in the personal routing template including the user financial data by associating the individual routing parameters to the data package; and
transmitting, by the routing client application, the encapsulated data package to a core network.

* * * * *